(12) United States Patent
Bauer

(10) Patent No.: US 9,090,254 B2
(45) Date of Patent: Jul. 28, 2015

(54) METHOD FOR OPERATING A SERIAL HYDRAULIC HYBRID DRIVE SYSTEM

(71) Applicant: Robert Bosch GmbH, Stuttgart (DE)

(72) Inventor: Richard Bauer, Zellingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/368,042

(22) PCT Filed: Dec. 21, 2012

(86) PCT No.: PCT/EP2012/076555
§ 371 (c)(1),
(2) Date: Jun. 23, 2014

(87) PCT Pub. No.: WO2013/092955
PCT Pub. Date: Jun. 27, 2013

(65) Prior Publication Data
US 2014/0372007 A1    Dec. 18, 2014

(30) Foreign Application Priority Data

Dec. 22, 2011    (DE) .......................... 10 2011 089 607

(51) Int. Cl.
*B60W 20/00* (2006.01)
*B60K 6/12* (2006.01)
*B60W 50/00* (2006.01)

(52) U.S. Cl.
CPC ............... *B60W 20/102* (2013.01); *B60K 6/12* (2013.01); *B60W 2050/0026* (2013.01); *Y02T 10/6208* (2013.01)

(58) Field of Classification Search
USPC ............... 180/65.21, 65.22, 65.225, 65.265; 701/22, 99, 101, 102; 477/2, 3, 7, 15, 477/18
See application file for complete search history.

(56) References Cited

U.S. PATENT DOCUMENTS

| 4,674,280 A | * | 6/1987 | Stuhr | ............................. 60/413 |
| 2010/0298081 A1 | * | 11/2010 | Ivanysynova et al. | .......... 475/72 |

FOREIGN PATENT DOCUMENTS

| DE | 102008021889 | 11/2009 |
| WO | 2008071381 | 6/2008 |
| WO | 2008088554 | 7/2008 |

OTHER PUBLICATIONS

International Search Report for Application No. PCT/EP2012/076555 dated Mar. 18, 2013 (English Translation, 2 pages).

* cited by examiner

*Primary Examiner* — Richard Camby
(74) *Attorney, Agent, or Firm* — Michael Best & Friedrich LLP

(57) ABSTRACT

The invention relates to a method for operating a preferably serial hydraulic hybrid drive system (1), comprising an internal combustion engine (8), a first expulsion machine (11), a second expulsion machine (12), a pressure accumulator (20) and an isolating valve device (30). For the purpose of optimization it is proposed that for various operating modes in each case a total efficiency level is read out from characteristic maps. These total efficiency levels are compared with one another. The operating mode with the best total efficiency level is subsequently selected.

18 Claims, 1 Drawing Sheet

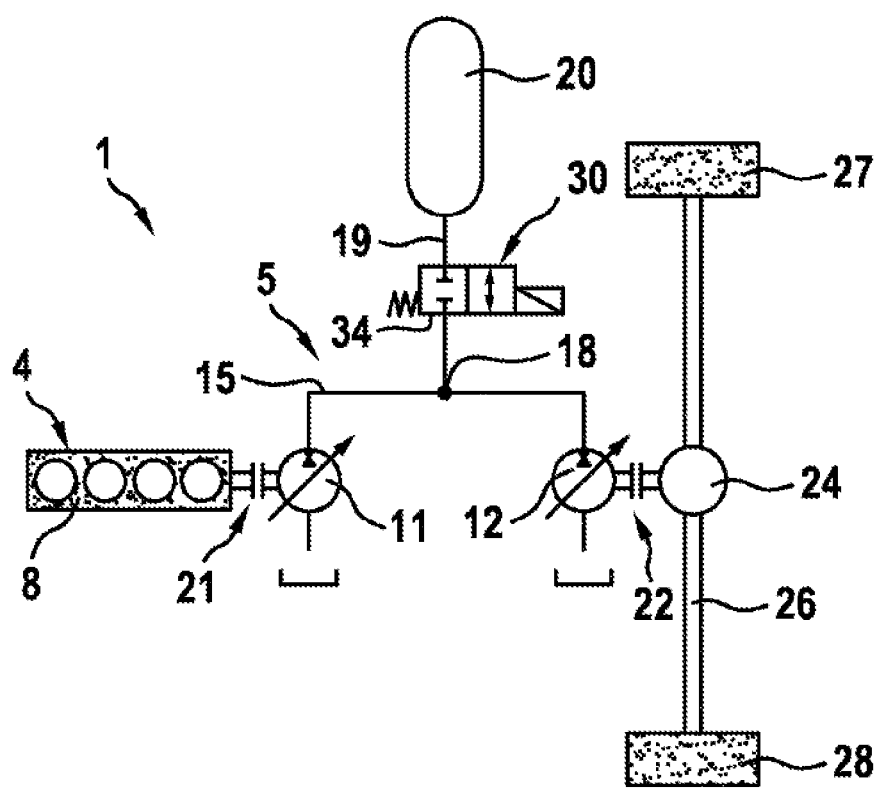

METHOD FOR OPERATING A SERIAL HYDRAULIC HYBRID DRIVE SYSTEM

BACKGROUND OF THE INVENTION

The invention relates to a method for operating a preferably serial hydraulic hybrid drive system.

The Parker company has developed a serial hydraulic drive system, which is available under the name "RunWise". It was developed for heavy commercial vehicles and is additionally retrospectively installed in a mechanical drive. In doing this the mechanical drive train is divided and the "RunWise" system is inserted.

All hybrid drive systems consist of energy converters, revolution rate converters and torque converters connected in series or parallel. Each of said converters, which are also referred to below as components, has operating point dependent efficiency, which usually depends on different external and internal influences.

The efficiency is defined here as the ratio of useful energy to energy expenditure:

$$\eta = \frac{W_{useful}}{W_{expenditure}} \quad \text{(Eq. 1)}$$

The operating point at which a component is operated has a significant influence on the efficiency of the component. For each component the efficiency performance can be stored in the form of characteristic curves and/or characteristic fields.

A serial hydraulic drive train can e.g. comprise the following components: internal combustion engine, hydraulic pump, hydraulic motor and pressure reservoir. The components of the drive train can be operated in different operating modes. Thus the hydraulic motor can also be operated as a pump. When this is the case the hydraulic motor converts the kinetic energy of the vehicle into hydraulic energy and couples it into the pressure reservoir. Moreover, the pressure reservoir can be filled or discharged.

As a rule, the drive train has a different overall efficiency in different operating modes, even if it is providing the same useful power to the driven wheel(s) of the vehicle.

SUMMARY OF THE INVENTION

The problem underlying the invention is solved by the method of the invention Important features of the invention are also to be found in the following description and in the figures, wherein the features can be important for the invention both on their own and also in different combinations, without being explicitly referred to again.

The invention enables an energy efficient operation of hybrid vehicles, especially of serial hydraulic hybrid vehicles.

Through the knowledge of the efficiency characteristic fields of at least the most important components of the hybrid drive system and thus also the losses that occur during the energy conversion in the components involved, efficiency characteristic fields of the entire hybrid drive system can be generated. Using said efficiency characteristic fields according to the invention, the entire system can be operated with optimal energy efficiency for any load demand. Said characteristic fields are stored in a control device that activates the most energy efficient operating mode depending on the load demand and controls individual components of the drive train as required. Said procedure is also referred to as feedforward control in connection with the invention.

For the entire system the overall efficiency is given as the product of the efficiencies of all components involved in the entire system:

$$\eta_{Sys} = \prod_{n=1}^{k} \eta_n \quad \text{(Eq. 2)}$$

With most components, the efficiency depends on the operating point of the component.

Thus e.g. the efficiency of a hydraulic pump or of a hydraulic motor is essentially a function of the system variables such as pressure, revolution rate or displacement volume and the material variables such as density and viscosity of the hydraulic fluid. With pumps or engines with adjustable delivery rate, the delivery rate is a selectable (system) variable.

The material variables are as a rule a function of the system temperature and/or vary as a result of ageing processes.

Some of the system variables and/or material variables have a greater influence on the efficiency performance of the component than others. The more system variables and/or material variables that are included in the characteristic field, the more precisely the characteristic field reflects the actual operating behavior of a component. However, the complexity of the characteristic field also rises significantly as a result.

Therefore, those system variables and/or material variables that have a great influence on the efficiency performance and that can be measured well are preferably used for the computation or empirical determination of the characteristic fields. By reducing the system variables and/or material variables to quantifiable and influential magnitudes, the cost of producing the characteristic fields and their complexity can be reduced. The number of system and material variables determines the dimensionality of the characteristic field of a component. The number of dimensions of a characteristic field is referred to as the dimensionality of a characteristic field in connection with the invention.

The efficiency of a component can consequently be represented as a vector in a multidimensional space. Said multidimensional space is thereby spanned by the system variables and material variables.

If all efficiencies of the individual components are determined in this way, according to Gl. 2 above the efficiency of the entire system is the product of the efficiencies of the active components belonging to the entire system.

From Gl. 2 it is clear that multi-dimensional efficiency characteristic fields arise for complex systems such as a hydraulic drive system. Moreover, a hydraulic drive system can be operated in different operating modes with different efficiencies, because not all components are active in all operating modes and therefore the number of active components can vary.

Thus the hydraulic motor can be switched off, e.g. during energy recovery, because no drive power is required. In another operating mode the reservoir can be decoupled from the drive train if the total drive power of the hydraulic pump is to pass directly into the hydraulic motor.

A multi-dimensional efficiency characteristic field of the entire system is thus required for each operating mode.

In order to reduce the complexity and the dimensionality of the efficiency characteristic fields of the components, according to the invention the (system) variables of the components of the drive train are divided into three classes:

1. The variables influencing the efficiency are externally imposed (so-called imposed variables).

Examples of this are the revolution rate of a hydraulic motor, because the hydraulic motor is rigidly connected to the driven wheel, or the torque desired by a driver.

2. The variables influencing the efficiency are freely selectable within defined limits (so-called selectable variables).

An example of this is the selection of a gear in a manual transmission in a drive train or the transmission ratio in a CVT gearbox (CVT=Continuously Variable Transmission).

3. The variables influencing the efficiency arise from the physical relationships within the component.

An example of this is the friction losses in an internal combustion engine, which depend strongly on the revolution rate of the internal combustion engine. Said variables are consequently dependent variables. The dependent variables describe the physical relationships of a component.

Which system variable and material variable is dependent, imposed or freely selectable is dependent on the respective operating mode.

Thus e.g. for a vehicle with a continuous CVT gearbox the operating point/the revolution rate of the internal combustion engine is substantially freely selectable along the performance curve for the delivered power at the wheel, whereas for a vehicle with a manual transmission the gear ratio can be freely selected within limits. The maximum available torque and the revolution rate of the internal combustion engine are thus determined.

In order to reduce the dimensionality of the efficiency characteristic fields, according to the invention a determination of the maximum values of the efficiency is separately carried out for each operating mode depending on the freely selectable variables. This reduces the dimensionality of the efficiency characteristic fields of the components to the number of imposed variables.

According to the invention, for each operating mode of the drive train the freely selectable variables associated with maximum efficiency are written into a dedicated characteristic field with the dimensions of the imposed variables of all components.

The value of a freely selectable variable at which the drive train has the optimum efficiency can thus be read out from said characteristic field of the drive train.

The characteristic field thus obtained is used to predetermine the freely selectable variables depending on the imposed variables. All other variables arise in the system itself, because they are dependent variables.

It is also conceivable in practice to replace the multi-dimensional characteristic field by a plurality of characteristic fields with fewer dimensions and by characteristic curves or approximate equations.

BRIEF DESCRIPTION OF THE DRAWING

Further advantages and advantageous embodiments of the invention are to be found in the following FIGURE, its description and the claims.

In the FIGURE:

FIG. 1 shows the environment of the invention

DETAILED DESCRIPTION

In FIG. 1 a hydraulic hybrid drive train 1 is illustrated. In the hydraulic hybrid drive train 1 a first drive device 4 is connected in series with a second drive device 5. The first drive device 4 comprises an internal combustion engine 8, which is also referred to as a combustion engine. The second drive device 5 comprises two hydraulic displacement machines 11, 12, which are implemented as axial piston machines with an input side and an output side. The displacement machine 11 is a hydraulic pump with adjustable displacement volume per revolution (slow-running capability), whereas the displacement machine 12 is an adjustable hydraulic pump motor.

The input sides of the displacement machines 11, 12 are connected to a hydraulic medium reservoir. The reservoir can also be a pre-loaded system with a low pressure reservoir. The output sides of the displacement machines 11, 12 are directly hydraulically connected to each other by a connecting line 15. A branch 18 is provided in the connecting line 15, at which a connecting line 19 branches from the connecting line 15 to a pressure reservoir 20. The pressure reservoir 20 is implemented as a hydropneumatic pressure reservoir.

The displacement machine 11 can be drivably connected via a clutch and/or transmission device 21 to the internal combustion engine 8. Therefore the displacement machine 11 is also referred to as a primary side displacement machine. The displacement machine 11 can also consist of a cascade of a plurality of displacement machines. The displacement machine 12 can be drivably connected by means of a clutch and/or transmission device 22 and by a mechanical differential 24 to a vehicle axle 26. The displacement machine 12 can also consist of a cascade of a plurality of displacement machines. Two driven vehicle wheels 27, 28 are indicated at the ends of the vehicle axle 26.

The torque that can be applied by the hydraulic displacement machines 11, 12 depends on the pressure difference applied to the displacement machines 11, 12. The pressure difference in turn depends on the fill level of the pressure reservoir 20. Hydraulic hybrid drive trains of motor vehicles undergo very dynamic and frequently changing torque demands, primarily during urban operation.

The drivability and performance of a hydraulic hybrid vehicle are very strongly influenced by the ability of the drive train to follow step changes in loading. However, other requirements, such as for example curb climbing, hill starting and/or operating with trailers, must also be met by a hydraulic hybrid drive train 1.

For the design of a hydraulic hybrid drive train 1 with a pressure reservoir 20, as used in hydraulic hybrid vehicles, there is the problem that high traction force demands, i.e. high torques on the secondary side or the wheel side, must be able to be enacted without a great time delay. This either has the result that the filling strategy of the pressure reservoir 20 must be maintained at a relatively high pressure by the vehicle controller in a lower speed range, or that the secondary side components have to be dimensioned to be so large that high traction force demands can be enacted even at low pressure.

In both cases there are negative effects on the drive train efficiency. In the case of a high target pressure value the usable energy content of the pressure reservoir 20 is extremely reduced, whereby the recovery capacity is severely limited. Moreover, the provision of the high pressure with low load demands ensures an operating point shift of the displacement machine towards a lower partial load, with low efficiency.

With over dimensioning of the displacement machine in order to be able to build up the high torques with low pressure, a similar operating point shift to poor efficiencies arises at all pressures above the design pressure. To make matters worse, a larger component requires more installation space, i.e. is harder to integrate, and also has higher mass, which also has an adverse effect on the overall energy balance.

Therefore a decoupling valve device 30 is provided in the connecting line 19 in the hydraulic hybrid drive train 1. Using the decoupling valve device 30, the pressure reservoir 20 can be decoupled from the rest of the system. This enables the primary side displacement machine 11 to be directly hydraulically connected to the secondary side displacement machine 12. The result is that a system pressure that is above the reservoir pressure can be built up in the connecting line 15 within a very short time.

The decoupling valve device 30 illustrated in FIG. 1 is implemented as a 2/2 way valve 34 with a closed position and an open position. The 2/2 way valve 34 is biased into its illustrated closed position by a spring. The valve 34 can be changed over into its open position by electromagnetic operation. In the closed position the connection between the branch 18 and the pressure reservoir 20 is interrupted. In the open position of the valve 34 the connecting line 15 is connected via the branch 18 to the pressure reservoir 20.

The decoupling valve device 30 illustrated in FIG. 1 can also be implemented as a 2/2 way proportional valve. Such a proportional valve is also referred to as a continuous valve and enables continuous adjustment between the open position and the closed position. The continuous valve enables smoothing of decoupling and connecting of the pressure reservoir 20.

With said drive train there is a plurality of operating modes, of which the most important are explained below:

1. CVT Mode

In a first operating mode, the so-called CVT mode, the reservoir decoupling valve 34 is closed. The pressure reservoir 20 is consequently decoupled from the hybrid drive system 10 and as a result thereof is neither filled nor emptied. In said first operating mode the internal combustion engine 8 drives the primary displacement machine 11 via the clutch 21 and the machine 11 draws hydraulic fluid from a reservoir and increases its pressure. The pressure energy of the hydraulic fluid drives the secondary displacement machine 12 directly. The secondary displacement machine 12 is now working as a hydraulic motor.

The drive torque produced by the secondary displacement machine 12 is transferred by the clutch 22 to the differential 24 and to the wheels 27, 28 of the vehicle.

Because the throughput capacity of the first and/or the second displacement machine 11, 12 is adjustable, a continuous gearbox is achieved in said operating mode.

The active components in said operating mode are listed and its system variables are classified below:

II. Reservoir Filling Mode and Reservoir Discharging Mode

In a second operating mode, the so-called reservoir filling mode, in contrast to the first operating mode the reservoir decoupling valve 34 is opened. Thus the power produced by the internal combustion engine 8 that is not required for generation of the drive torque is stored as pressure energy in the pressure reservoir 20.

If the required drive torque is greater than the power available from the internal combustion engine 8, pressure energy is taken from the pressure reservoir 20 so that the secondary displacement machine 12 can provide the required drive torque.

III. Reservoir Driving

In a third operating mode, the so-called storage driving, the internal combustion engine 8 and the first displacement machine 11 are switched off. The power required for generating the drive torque is taken from the pressure reservoir 20. The secondary displacement machine 12 operates as a hydraulic motor that converts the pressure energy of the hydraulic fluid from the pressure reservoir 20 into the drive torque.

IV. Energy Recovery

Finally, a fourth operating mode is referred to as regenerative braking or energy recovery. In said operating mode the secondary displacement machine 12 operates as a hydraulic pump. In this case the secondary displacement machine 12 uses the brake torque in order to fill the pressure reservoir 20. The internal combustion engine 8 can be switched on.

From the above it is clear that the selection of an operating mode that is optimal in energy terms is not trivial. The method according to the invention enables "automatic" selection of the operating mode and control of the selectable variables of the active components in order to be able to operate the drive train with optimum energy efficiency for a specified load demand.

As already explained, with most components of a system the efficiency η depends on an operating point and on a state of the component. Thus e.g. the efficiency $\eta_{Pumpe}$ of a hydraulic pump or of a hydraulic motor is essentially a function of the pressure p, the revolution rate n, the displacement volume V and the temperature T, the density ρ and the viscosity v of the hydraulic fluid.

The following applies:

$$\eta_{Pump} = f(\vec{p}, \vec{n}, \vec{V}, \vec{T}, \ldots) \tag{Eq. 3}$$

Some of the above influencing variables have a greater influence on the efficiency η than other influencing variables. According to the invention, for the computation of the efficiency η at different operating points those influencing variables are used that have a large influence on the efficiency η and can be measured well. Thus equation 3 reduces as follows:

$$\eta_{Pump} = f(\vec{p}, \vec{n}, \vec{V}) \tag{Eq. 4}$$

For an efficiency $\eta_B$ of the internal combustion engine 8, significant influencing variables are a torque M, the revolution rate n, the temperature T and a torque gradient $$\frac{\partial M}{\partial t}.$$

In simple terms the efficiency can also be represented as a function of revolution rate and torque:

$$\eta_B = f(\vec{M}, \vec{n}) \tag{Eq. 5}$$

In this or a similar manner, an efficiency q can be determined for each component of the hybrid drive system. The influencing variables are advantageously represented as vectors.

The overall efficiency $\eta_{Sys}$ of the hybrid drive system is given by the product of the efficiencies η of each component that participates in the energy conversion (see Gl. 2)

If the efficiencies for all components according to Gl. 1.3, 4 or 5 are used in equation 2, a multidimensional efficiency characteristic field is obtained for each operating mode of the hybrid drive system.

The operating points of the individual components are not completely freely selectable here, but are rather composed of freely selectable variables, imposed variables and dependent variables.

The following applies:

$$P_{wheel} = M \cdot n \cdot 2\pi = \text{const.} \tag{Eq. 6}$$

The drive train must provide this power, wherein according to the invention the operating mode is selected at which the drive train has the best overall efficiency.

To explain the method according to the invention, a system comprising an internal combustion engine 8 and a primary displacement machine 11 will be used. The displacement machine 11 is directly flanged to a crankshaft of the internal combustion engine 8 and fills the pressure reservoir 20. For simplicity, the losses in valves and lines are ignored and an efficiency of the pressure reservoir 20 of 1 is assumed. This means that storage of energy in and removal of energy from the pressure reservoir 20 takes place without losses.

The efficiency $\eta_B$ of the internal combustion engine 8 is given by:

$$\eta_B = f(\vec{M}, \vec{n})$$

The efficiency $\eta_{Pumpe}$ of the displacement machine 11 is given by:

$$\eta_{Pump} = f(\vec{p}, \vec{n}, \vec{V})$$

The revolution rate n of the displacement machine 11 is equal to the revolution rate of the internal combustion engine 8, because the displacement machine 11 is directly flanged to the crankshaft of the internal combustion engine 8.

The pressure p of the displacement machine 11 is equal to the pressure in the pressure reservoir 20. The displacement volume V of the first displacement machine 11 is adjusted such that the torque M of the internal combustion engine 8 is taken up.

The pressure p of the second displacement machine 12 is also equal to the pressure in the pressure reservoir 20. The displacement volume V of the second displacement machine 12 is equal to the displacement volume of the first displacement machine 11 and the volumetric flow into or out of the pressure reservoir 20.

According to Gl. 2 the overall efficiency characteristic field $\eta_{Sys}$ for the drive train is given as follows:

$$\eta_{Sys} = f(\vec{M}, \vec{n}, \vec{p})$$

With said efficiency characteristic field $\eta_{Sys}$, e.g. a target torque and the revolution rate n of the With internal combustion engine 8 are variables imposed on the system. Likewise the pressure p is imposed on the system. The displacement volume V is a dependent variable.

The application according to the invention to the serial hydraulic hybrid drive leads to the following result for the different operating modes:

In the first operating mode, the CVT mode, four influencing variables determine the efficiency η, wherein two influencing variables are freely selectable and two influencing variables are imposed on the hydraulic drive system 1.

In the second operating mode, the reservoir filling mode, five influencing variables determine the efficiency η. Of the five influencing variables, two are freely selectable and three are imposed.

For the third and fourth operating modes, i.e. the storage driving and the energy recovery modes, the efficiency η is determined by three influencing variables, wherein all three influencing variables are imposed on the hydraulic drive system 1.

For each of the four operating modes, the optimal operating point, characterized by the freely selectable variables, is determined by means of a maximum value of the efficiency η.

This reduces the dimension of the overall efficiency characteristic field to the number of the imposed variables. This means that for each operating mode each freely selectable variable and the associated efficiency η are written in a dedicated characteristic field with the dimension of the imposed variable. This results in characteristic fields from which the freely selectable variables are taken, which produce an operating point with maximum efficiency η of the hybrid drive system 1 for the corresponding operating mode.

Said efficiency characteristic fields are stored in a control device of the drive train and are used there to implement the method according to the invention.

The method according to the invention is based on said efficiency characteristic fields and enables the computation and selection of the operating mode that is optimal in terms of energy.

For this purpose, the efficiency η for the power required at the wheel (Gl. 6) is initially computed for each of the four above-mentioned operating modes Initially a filling efficiency $\eta_{EES}$ is computed:

$$\eta_{EES} = \frac{E_{EES\_G} + E_{EES\_R}}{E_{FT\_G} - E_{FT\_IVT}} \quad \text{(Eq. 7)}$$

In the above $E_{EES\_G}$ stands for the energy that is generated by the primary displacement machine 12 and is stored in the pressure reservoir 20. $E_{EES\_R}$ represents the energy produced by energy recovery from braking energy and stored in the pressure reservoir 20. $E_{FT\_G}$ stands for the chemical energy consumed by the internal combustion engine 4 in the form of fuel during the generation of $E_{EES\_G}$.

$E_{FT\_IVT}$ stands for the energy that would have been consumed if the internal combustion engine 4 had been operated with a closed reservoir decoupling valve 34 (CVT mode). The above equation thus reflects the ratio of energy stored in the pressure reservoir 20 (numerator of Gl. 7) to the additional consumption of energy by generation (denominator of Gl. 7). Here it is assumed that the energy stored in the reservoir $E_{ESS\_R}$ by energy recovery causes no additional generation costs.

The efficiencies η of the individual operating modes are defined as follows:

For the first operating mode, CVT driving, in which the pressure reservoir is decoupled from the hydraulic drive system 1, the following applies:

$$\eta_{IVT} = \frac{E_{Output}}{E_{FT\_IVT}} \quad \text{(Eq. 8)}$$

Here $E_{output}$ is the energy produced at the clutch 22 by the hybrid drive system 1. $E_{FT\_1VT}$ is the chemical energy contained by a quantity of fuel that is consumed by the internal combustion engine 8 to produce $E_{Output}$.

For the second operating mode, reservoir filling mode, the efficiency $\eta_G$ is given by:

$$\eta_G = \frac{E_{EES\_G} + E_{Output}}{E_{FT\_G}} \quad \text{(Eq. 9)}$$

The useful energy in the denominator is composed of the effective output energy $E_{Output}$ at the clutch and the energy $E_{EES\_G}$ stored in the pressure reservoir 20. In the denominator the energy $E_{FT\_G}$ stands for the energy consumed by the internal combustion engine 8 in the form of fuel during reservoir filling mode.

For the third operating mode, storage driving, the efficiency $\eta_{SF}$ is computed as follows:

$$\eta_{SF} = \eta_{ESS} \frac{E_{Output}}{E_{ESS\_SF}} \quad \text{(Eq. 10)}$$

Here the useful drive energy, $E_{output}$ is set in a ratio to the energy $E_{ESS\_SF}$. The energy $E_{ESS\_SF}$ is the energy taken from the pressure reservoir 20. Equation 10 also takes into account with the term $\eta_{EES}$ that work or energy is necessary to fill the pressure reservoir 20. The filling efficiency $\eta_{EES}$ is thereby computed according to Gl. 7.

For the fourth operating mode, energy recovery or regenerative braking, no efficiency has to be computed, because the recovered energy would normally be lost as thermal energy during braking The "recovery" of braking energy consequently requires no energy expenditure and is therefore considered to be "free of charge".

All the energy used in equations 7 to 10 is computed online during operation. The optimum operating mode for the current operating point is that with the greatest efficiency. By comparing the different overall efficiencies according to Gl. 8 to 10, the operating mode with the best efficiency for the target torque of the driver or the power $P_{Rad}$ to be delivered at the wheel can be determined. The hybrid drive system 1 is operated in this operating mode.

The invention claimed is:

1. A method for the operation of a hydraulic hybrid drive system (1), comprising an internal combustion engine (8), a first displacement machine (11), a second displacement machine (12), a pressure reservoir (20) and a decoupling valve device (30), characterized in that for a specified load point ($P_{Rad}$) an overall efficiency of the hybrid drive system (1) for all possible operating modes is read out from corresponding overall efficiency characteristic fields, wherein, for each mode of operation, a freely selectable variable associated with maximum efficiency is written into a dedicated characteristic field, and where the variables are compared with each other and the hybrid drive system (1) is operated in the operating mode having the best overall efficiency.

2. The method as claimed in claim 1, characterized in that a first operating mode (CVT operating mode) involves operation of the hybrid drive system (1) without a pressure reservoir (20).

3. The method as claimed in claim 1, characterized in that in a second operating mode (reservoir filling and discharging mode) energy that is required at an output (24, 27, 28) of the hybrid drive system (1) and is not produced by the internal combustion engine (8), is taken from the pressure reservoir (20), or the energy that is produced by the internal combustion engine (8) and is not required at an output (24, 27, 28) of the hybrid drive system (1) is stored in the pressure reservoir (20).

4. The method as claimed in claim 1, characterized in that in a third operating mode (storage driving) energy that is required at an output (24, 27, 28) of the hybrid drive system (1) is provided from the pressure reservoir (20) (and the internal combustion engine (8) is providing no energy).

5. The method as claimed in the preceding claim 1, characterized in that in a fourth operating mode (energy recovery), energy that is released by deceleration of an output (24, 27, 28) is stored in the pressure reservoir (20).

6. The method as claimed in claim 1, characterized in that an efficiency ($\eta_{ESS}$) for the storage of energy in the pressure reservoir (20) is computed according to the following equation $$\eta_{EES} = \frac{E_{EES\_G} + E_{EES\_R}}{E_{FT\_G} - E_{FT\_IVT}}$$

Where:
$E_{EES\_G}$: is the energy that is produced by the primary displacement machine (11) and stored in the pressure reservoir (20)
$E_{EES\_R}$: is the energy produced by energy recovery from braking energy and stored in the pressure reservoir (20)
$E_{FT\_G}$: is the energy that is consumed by the internal combustion engine (8) in the form of fuel during the generation of $E_{EES\_G}$
$E_{FT\_IVT}$ represents the energy that would have been consumed if the internal combustion engine (8) had been operated in the first (CVT) operating mode.

7. The method as claimed in claim 2, characterized in that in the first (CVT) operating mode the efficiency is computed according to the following equation:

$$\eta_{IVT} = \frac{E_{Output}}{E_{FT\_IVT}}$$

Where:
$E_{Output}$: is the energy generated at a clutch (22) of the hybrid drive system (10)
$E_{FT\_NT}$: is the chemical energy that is consumed by the internal combustion engine (8) to generate $E_{Output}$.

8. The method as claimed in claim 3, characterized in that the efficiency ($\eta_G$) for the second operating mode is computed according to the following equation:

$$\eta_G = \frac{E_{EES\_G} + E_{Output}}{E_{FT\_G}}$$

Where:
$E_{Output}$: is the effective output energy at the clutch (22)
$E_{EES\_G}$: is the energy stored in the pressure reservoir (20)
$E_{FT\_G}$: is the chemical energy consumed by the internal combustion engine (8) in the form of fuel in the second operating mode.

9. The method as claimed in claim 4, characterized in that the efficiency ($\eta_{SF}$) for the third operating mode is computed according to the following equation:

$$\eta_{SF} = \eta_{ESS} \frac{E_{Output}}{E_{ESS\_SF}}$$

Where
$E_{Output}$: is the effective output energy at the clutch (22)
$E_{ESS\_SF}$: is the energy taken from the pressure reservoir (20)
$\eta_{EES}$: is the efficiency of the storage process.

10. The method as claimed in claim 2, characterized in that in a second operating mode (reservoir filling and discharging mode) energy that is required at an output (24, 27, 28) of the hybrid drive system (1) and is not produced by the internal combustion engine (8), is taken from the pressure reservoir (20), or the energy that is produced by the internal combustion engine (8) and is not required at an output (24, 27, 28) of the hybrid drive system (1) is stored in the pressure reservoir (20).

11. The method as claimed in claim 10, characterized in that in a third operating mode (storage driving) energy that is required at an output (24, 27, 28) of the hybrid drive system (1) is provided from the pressure reservoir (20) (and the internal combustion engine (8) is providing no energy).

12. The method as claimed in the preceding claim 11, characterized in that in a fourth operating mode (energy recovery), energy that is released by deceleration of an output (24, 27, 28) is stored in the pressure reservoir (20).

13. The method as claimed in claim 12, characterized in that an efficiency ($\eta_{EES}$) for the storage of energy in the pressure reservoir (20) is computed according to the following equation $$\eta_{EES} = \frac{E_{EES\_G} + E_{EES\_R}}{E_{FT\_G} - E_{FT\_IVT}}$$

Where:
$E_{EES\_G}$: is the energy that is produced by the primary displacement machine (11) and stored in the pressure reservoir (20)
$E_{EES\_R}$: is the energy produced by energy recovery from braking energy and stored in the pressure reservoir (20)
$E_{FT\_G}$: is the energy that is consumed by the internal combustion engine (8) in the form of fuel during the generation of $E_{EES\_G}$
$E_{FT\_IVT}$ represents the energy that would have been consumed if the internal combustion engine (8) had been operated in the first (CVT) operating mode.

14. The method as claimed in claim 13, characterized in that in the first (CVT) operating mode the efficiency is computed according to the following equation:

$$\eta_{IVT} = \frac{E_{Output}}{E_{FT\_IVT}}$$

Where:
$E_{Output}$: is the energy generated at a clutch (22) of the hybrid drive system (10)
$E_{FT\_NT}$: is the chemical energy that is consumed by the internal combustion engine (8) to generate $E_{Output}$.

15. The method as claimed in claim 14, characterized in that the efficiency ($\eta_G$) for the second operating mode is computed according to the following equation:

$$\eta_G = \frac{E_{EES\_G} + E_{Output}}{E_{FT\_G}}$$

Where:
$E_{Output}$: is the effective output energy at the clutch (22)
$E_{EES\_G}$: is the energy stored in the pressure reservoir (20)
$E_{FT\_G}$: is the chemical energy consumed by the internal combustion engine (8) in the form of fuel in the second operating mode.

16. The method as claimed in claim 15, characterized in that the efficiency ($\eta_{SF}$) for the third operating mode is computed according to the following equation:

$$\eta_{SF} = \eta_{ESS} \frac{E_{Output}}{E_{ESS\_SF}}$$

Where
$E_{Output}$: is the effective output energy at the clutch (22)
$E_{ESS\_SF}$: is the energy taken from the pressure reservoir (20)
$\eta_{EES}$: is the efficiency of the storage process.

17. The method as claimed in claim 16, characterized in that the efficiency ($\eta$) of the fourth operating mode is set to 1.

18. The method as claimed in claim 1, characterized in that the drive system is a serial hydraulic hybrid drive system.

\* \* \* \* \*